United States Patent
Wolfe

(10) Patent No.: US 7,774,767 B2
(45) Date of Patent: Aug. 10, 2010

(54) SYSTEM AND METHOD FOR COMPILER INTERPROCEDURAL OPTIMIZATION HAVING SUPPORT FOR OBJECT FILES IN LIBRARIES

(75) Inventor: Michael J. Wolfe, Hillsboro, OR (US)

(73) Assignee: STMIcroelectronics, Inc., Carrollton, TX (US)

(*) Notice: Subject to any disclaimer, the term of this patent is extended or adjusted under 35 U.S.C. 154(b) by 1000 days.

(21) Appl. No.: 11/347,108

(22) Filed: Feb. 3, 2006

(65) Prior Publication Data
US 2007/0240132 A1    Oct. 11, 2007

(51) Int. Cl.
G06F 9/45     (2006.01)
(52) U.S. Cl. ................. 717/151; 717/157; 717/159
(58) Field of Classification Search ......... 717/151, 717/157, 159
See application file for complete search history.

(56) References Cited

U.S. PATENT DOCUMENTS

| | | | |
|---|---|---|---|
| 5,375,242 A * | 12/1994 | Kumar et al. | 717/147 |
| 5,778,212 A * | 7/1998 | Dehnert et al. | 717/155 |
| 2003/0005421 A1 * | 1/2003 | Prakash et al. | 717/152 |
| 2004/0015917 A1 * | 1/2004 | Click et al. | 717/150 |
| 2005/0015752 A1 * | 1/2005 | Alpern et al. | 717/131 |
| 2005/0028151 A1 * | 2/2005 | Roth et al. | 717/162 |
| 2005/0125783 A1 * | 6/2005 | Tatge et al. | 717/152 |
| 2005/0160058 A1 * | 7/2005 | Li et al. | 707/1 |
| 2007/0094637 A1 * | 4/2007 | Hayes | 717/106 |

* cited by examiner

Primary Examiner—Anna Deng
(74) Attorney, Agent, or Firm—Lisa K. Jorgenson; William A. Munck

(57) ABSTRACT

A method includes extracting at least one object file from a library of object files. The method also includes identifying an interprocedural optimization associated with a plurality of object files. The plurality of object files includes the at least one extracted object file. The method further includes invoking recompilation of at least one of the plurality of object files to implement the identified interprocedural optimization. In addition, the method includes generating at least one executable file using the at least one recompiled object file. The plurality of object files could include interprocedural summary information generated by a compiler during a compilation of at least one source file and a compiler internal representation associated with the compiler during the compilation. The interprocedural optimization could be identified using the interprocedural summary information, and the at least one recompiled object file could be generated using the compiler internal representation.

20 Claims, 3 Drawing Sheets

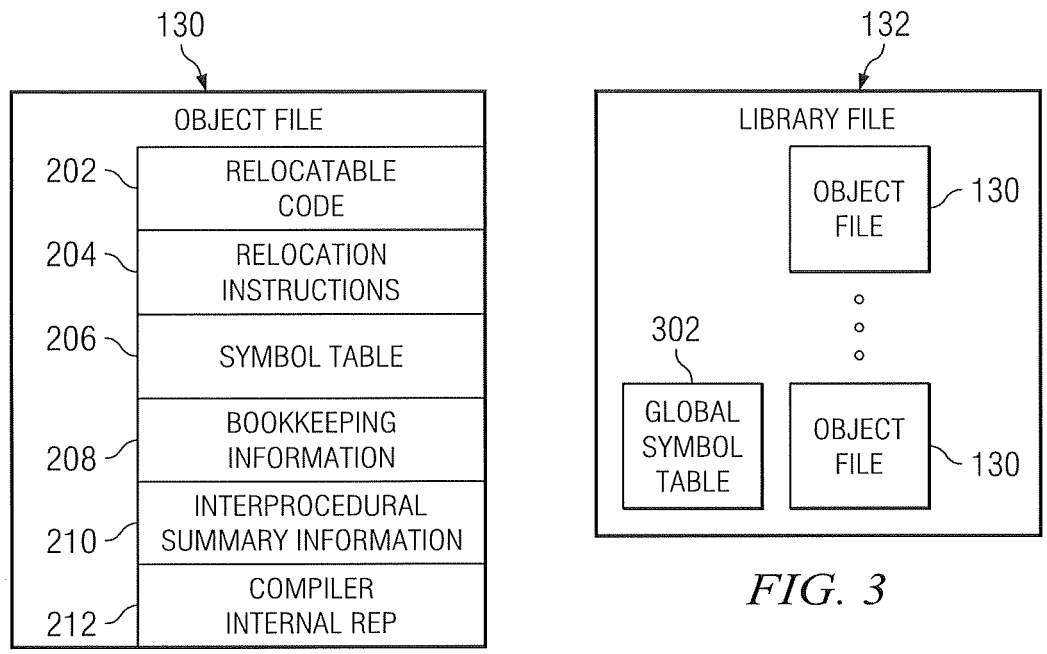
FIG. 2
FIG. 3
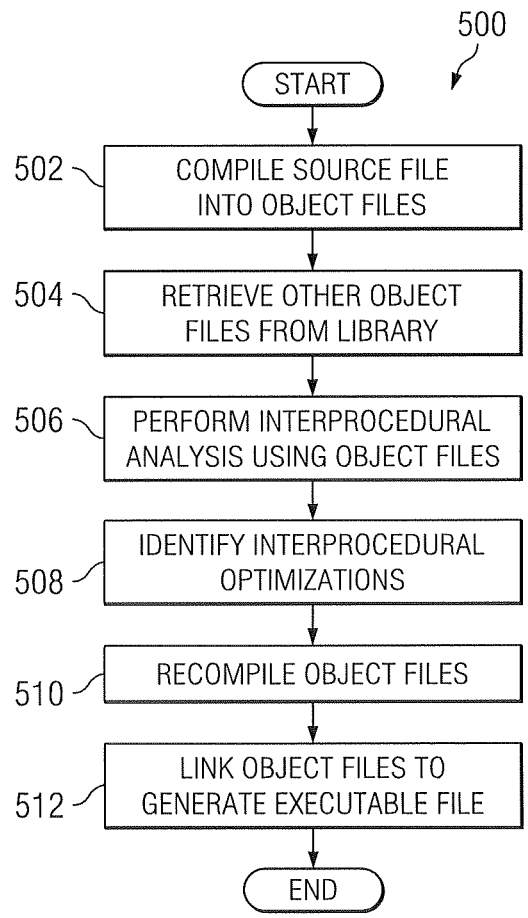
FIG. 5

SYSTEM AND METHOD FOR COMPILER INTERPROCEDURAL OPTIMIZATION HAVING SUPPORT FOR OBJECT FILES IN LIBRARIES

TECHNICAL FIELD

This disclosure is generally directed to computing systems and more specifically to a system and method for compiler interprocedural optimization having support for object files in libraries.

BACKGROUND

A compiler is routinely used to translate a high level computer program and produce object files containing machine code. A linker is then routinely used to bind procedures in the object files to form an executable program that is ready for execution on a target machine. A group of compiled object files may be collected to form a library, and a table of contents or directory identifies the procedures in the library object files and how to extract the procedures from the library object files. If necessary, the linker can extract the necessary object files from a library and use those object files to create the executable program.

Ideally, a compiler generates machine code that is as efficient as possible, thereby helping to ensure that an executable program can be executed as fast as possible. Techniques for increasing the efficiency of machine code generated by compilers are typically referred to as "compiler optimization." One conventional approach to compiler optimization is called "interprocedural optimization." Using this approach, a compiler detects characteristics of a target procedure and then uses those characteristics to optimize procedures that invoke or that are invoked by the target procedure. However, conventional interprocedural optimization techniques typically cannot work or work poorly when object files in a library are used during compilation. In particular, the conventional approaches are unable to actually optimize procedures in library object files. Moreover, some programs or systems actually require or mandate the use of libraries. In addition, the steps taken to create object files in a library are often different from the steps taken to create the object files to which interprocedural optimization is being applied. These problems typically cause a reduction in the efficiency of machine code generated by the compiler. This, in turn, typically reduces the execution speed of the corresponding executable program.

SUMMARY

This disclosure provides a system and method for compiler interprocedural optimization having support for object files in libraries.

In a first embodiment, a method includes extracting at least one object file from a library of object files. The method also includes identifying an interprocedural optimization associated with a plurality of object files. The plurality of object files includes the at least one extracted object file. The method further includes invoking recompilation of at least one of the plurality of object files to implement the identified interprocedural optimization. In addition, the method includes generating at least one executable file using the at least one recompiled object file.

In particular embodiments, the plurality of object files includes (i) interprocedural summary information generated by a compiler during a compilation of at least one source file and (ii) a compiler internal representation associated with the compiler during the compilation of at least one source file. The interprocedural optimization is identified using the interprocedural summary information, and the at least one recompiled object file is generated using the compiler internal representation.

In a second embodiment, an apparatus includes at least one memory capable of storing a library of object files. The apparatus also includes at least one processor capable of extracting at least one of the object files from the library of object files and identifying an interprocedural optimization associated with a plurality of object files. The plurality of object files includes the at least one extracted object file. The at least one processor is also capable of recompiling at least one of the plurality of object files to implement the identified interprocedural optimization and generating at least one executable file using the at least one recompiled object file.

In a third embodiment, a computer program is embodied on a computer readable medium and is operable to be executed by a processor. The computer program includes computer readable program code for extracting at least one object file from a library of object files and identifying an interprocedural optimization associated with a plurality of object files. The plurality of object files includes the at least one extracted object file. The computer program also includes computer readable program code for invoking recompilation of at least one of the plurality of object files to implement the identified interprocedural optimization and invoking generation of at least one executable file using the at least one recompiled object file.

Other technical features may be readily apparent to one skilled in the art from the following figures, descriptions, and claims.

BRIEF DESCRIPTION OF THE DRAWINGS

For a more complete understanding of this disclosure and its features, reference is now made to the following description, taken in conjunction with the accompanying drawings, in which:

FIG. 2 illustrates an example augmented object file according to one embodiment of this disclosure;

FIG. 3 illustrates an example library file containing augmented object files according to one embodiment of this disclosure;

FIG. 5 illustrates an example method for generating an executable program using compiler interprocedural optimization involving augmented object files according to one embodiment of this disclosure.

DETAILED DESCRIPTION

Figure 1:
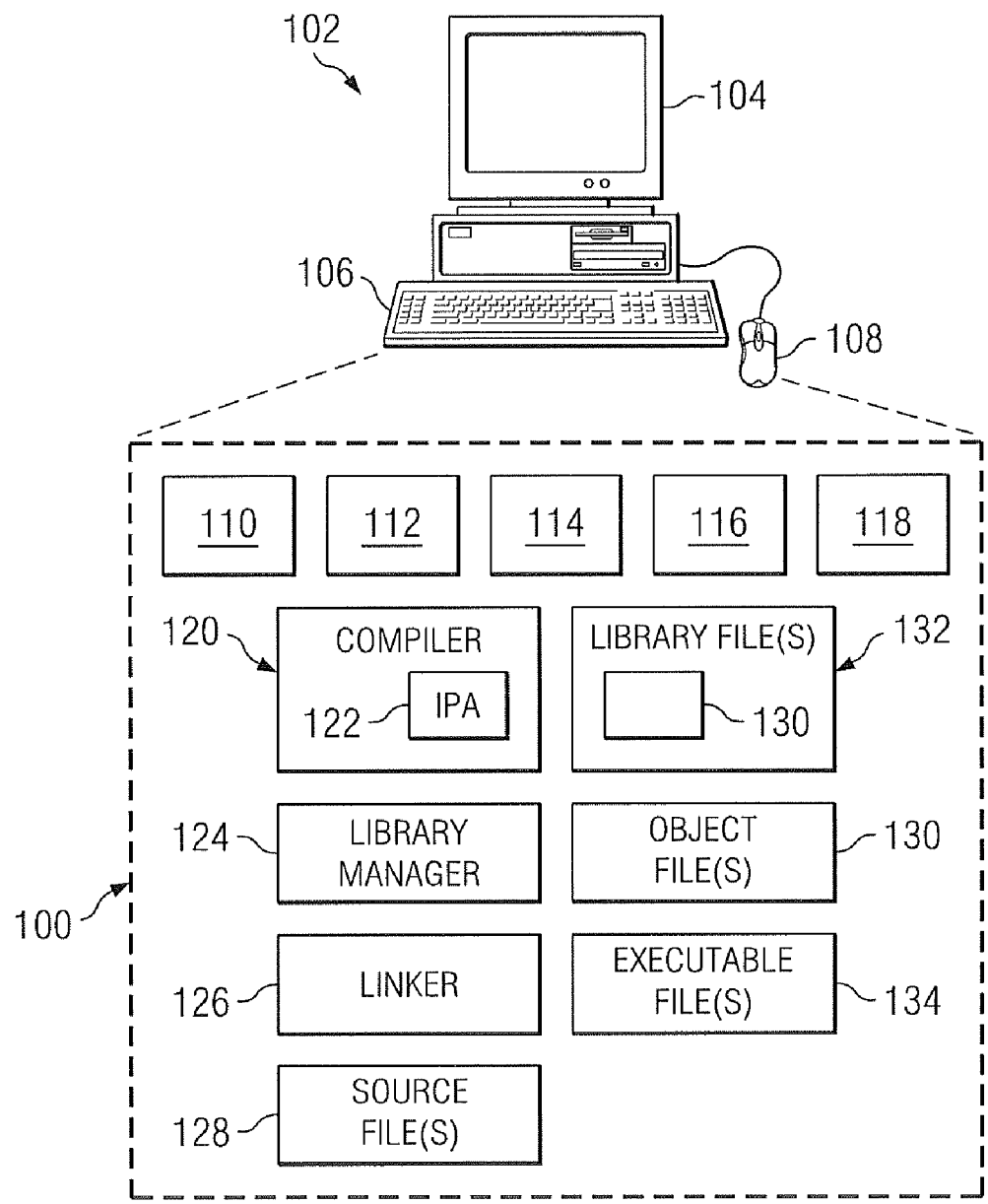
FIG. 1 illustrates an example system for compiler interprocedural optimization involving augmented object files according to one embodiment of this disclosure.

FIG. 1 illustrates an example system 100 for compiler interprocedural optimization involving augmented object files according to one embodiment of this disclosure. The embodiment of the system 100 shown in FIG. 1 is for illustration only. Other embodiments of the system 100 could be used without departing from the scope of this disclosure.

As shown in FIG. 1, the system 100 includes a host 102. In this particular example, the host 102 represents a desktop computer having various input/output devices, such as a monitor 104, a keyboard 106, and a mouse 108. Items within the dashed lines of FIG. 1 represent additional components within the host 102. As shown in this example, the host 102 also includes a processor 110, a random access memory (RAM) 112, a read only memory (ROM) 114, a magnetic storage device 116 (such as a hard drive), and an optical drive 118 (such as a CD or DVD drive). This represents one possible configuration of the host 102. Any other host 102 having any other configuration may be used in the system 100, such as a laptop computer, server computer, or handheld computer.

In this example, the host 102 further includes a compiler 120 having an interprocedural analysis (IPA) module 122, a library manager 124, and a linker 126. The compiler 120 is capable of converting or translating source code into object code. For example, the compiler 120 could translate high level programming code from one or more source files 128 into object code in one or more object files 130. At least one of the object files 130 may be referred to as an "augmented" object file because the compiler 120 may include additional information in the object file 130 to support interprocedural optimization performed by interprocedural analysis module 122. For instance, an augmented object file 130 may contain interprocedural summary information and a compiler internal representation of any procedures in that augmented object file 130. The compiler 120 includes any hardware, software, firmware, or combination thereof for compiling source code into object code. The interprocedural analysis module 122 includes any hardware, software, firmware, or combination thereof for supporting interprocedural optimization. A source file 128 represents any file or files containing code to be compiled. An object file 130 represents any file or files containing compiled code.

The library manager 124 is capable of creating one or more libraries of object files. For example, the library manager 124 may group selected object files 130 into one or more library files 132. The library manager 124 may also create a table or contents or directory identifying the procedures contained in the object files 130 in a library file 132 and how to extract the procedures from the library file 132. The library manager 124 includes any hardware, software, firmware, or combination thereof for creating a library of object files. A library file 132 represents any file or files containing one or more object files 130, and one or more of those object files 130 may represent augmented object files.

The linker 126 is capable of binding procedures in various object files 130 to create one or more executable files 134. Each executable file 134 can then be executed by the host 102, such as by executing machine code contained in the executable files 134 using the processor 110. The object files 130 used by the linker 126 to generate an executable file 134 could include at least one augmented object file 130, which may have been stored in the library file 132. In this example, the linker 126 may use the directory of the library file 132 to identify one or more object files 130 in the library file 132 that contain one or more procedures needed by the linker 126. The linker 126 may then extract the one or more object files 130 from the library file 132 and use the one or more extracted object files 130 to generate the executable file 134. The linker 126 includes any hardware, software, firmware, or combination thereof for generating an executable file using one or more object files. An executable file 134 represents any file or files containing executable code, or code capable of being executed by the host 102.

As described in more detail below, an augmented object file 130 (which may have been extracted from a library file 132) can be optimized and/or recompiled by the interprocedural analysis module 122. This may be done prior to the linker 126 using the recompiled augmented object file 130 to generate an executable file 134. In this way, the system 100 supports interprocedural optimization even when object files from libraries are used to generate an executable file 134. This may help to increase the efficiency of machine code generated by the compiler 120 and increase the execution speed of the corresponding executable file 134.

In particular embodiments, the compiler 120, library manager 124, and linker 126 represent software applications stored in memory (such as any of elements 112-118) and executed by the processor 110. Also, the various files 128-134 may represent files stored in memory (such as any of elements 112-118) and processed or used by the processor 110.

Although FIG. 1 illustrates one example of a system 100 for compiler interprocedural optimization involving augmented object files, various changes may be made to FIG. 1. For example, the interprocedural optimization technique may be used in any suitable device or system and is not limited to the host 102 or system 100 shown in FIG. 1. Also, the interprocedural optimization technique could involve any number of source files 128, object files 130, library files 132, and executable files 134.

FIG. 2 illustrates an example augmented object file 130 according to one embodiment of this disclosure. The embodiment of the augmented object file 130 shown in FIG. 2 is for illustration only. Other embodiments of the augmented object file 130 could be used without departing from the scope of this disclosure. Also, for ease of explanation, the augmented object file 130 shown in FIG. 2 is described with respect to the system 100 of FIG. 1. The augmented object file 130 could be used with any suitable device and in any suitable system.

As shown in FIG. 2, the augmented object file 130 includes relocatable code 202 and relocation instructions 204. The relocatable code 202 represents compiled code, where an execution address of the compiled code can change depending on where the compiled code is located in memory during execution. The relocation instructions 204 represent instructions that are interpreted or otherwise used by the linker 126 to bind the relocatable code 202 to create the executable file 134. A symbol table 206 identifies any symbols defined and referenced by the object file 130. Bookkeeping information 208 represents various information generated during the compilation process or needed during the linking process, such as return values or pointers.

In addition, the augmented object file 130 includes interprocedural summary information 210 and a compiler internal representation 212. The interprocedural summary information 210 represents information generated by the compiler 120 that expresses the behavior of a target procedure (in the object file 130) from the point of view of other procedures that invoke or that are invoked by the target procedure. The compiler internal representation 212 represents the compiler's internal representation of the procedures in an object file 130. The internal representation of the procedures may be generated when the compiler 120 compiles the source file 128 and generates the interprocedural summary information 210.

The interprocedural analysis module 122 may use the interprocedural summary information 210 and the compiler internal representation 212 to optimize one or more procedures in the augmented object file 130. For example, the interprocedural analysis module 122 may use the interprocedural summary information 210 to determine how various procedures in the augmented object file 130 can be optimized before the linker 126 is invoked. In particular, the interprocedural analysis module 122 may use the interprocedural summary information 210 to identify specific interprocedural optimizations that could be used to optimize the procedures for a particular compilation. Once one or more specific interprocedural optimizations are identified, the interprocedural analysis module 122 may recompile the augmented object file 130 using the compiler internal representation 212 to implement the specific interprocedural optimization(s). This generates an optimized object file, which contains optimized procedures that can be used by the linker 126 to produce the executable file 134.

Although FIG. 2 illustrates one example of an augmented object file 130, various changes may be made to FIG. 2. For example, one or more of the object files 130 may contain interprocedural summary information 210 but not a compiler internal representation 212. In such a situation, the interprocedural summary information 210 may be used by the interprocedural analysis module 122 to identify interprocedural optimizations that apply to other object files. Also, the augmented object file 130 could include any other or additional information.

FIG. 3 illustrates an example library file 132 containing augmented object files 130 according to one embodiment of this disclosure. The embodiment of the library file 132 shown in FIG. 3 is for illustration only. Other embodiments of the library file 132 could be used without departing from the scope of this disclosure. Also, for ease of explanation, the library file 132 shown in FIG. 3 is described with respect to the system 100 of FIG. 1. The library file 132 could be used with any suitable device and in any suitable system.

As shown in FIG. 3, the library file 132 contains multiple object files 130. At least one of the object files 130 could represent the augmented object file 130 shown in FIG. 2 and described above. Also, depending on the particular implementation, one or more of the object files in the library file 132 could represent standard (non-augmented) object files.

The library file 132 also contains a global symbol table 302. The global symbol table 302 identifies all of the symbols, such as global variables and procedures, defined and referenced by the object files 130 in the library file 132. The global symbol table 302 includes any suitable structure or structures for identifying the symbols defined and referenced by the object files 130.

As described above and in more detail below, augmented object files 130 (whether or not stored in the library file 132) may be used during compiler optimization to optimize a program being compiled. However, the augmented object files 130 and the library files 132 containing augmented object files 130 could also be used in systems that do not support interprocedural optimization. In those systems, the augmented object files 130 and the library files 132 are used by the linker 126 in a conventional manner to create the executable files 134. Because of this, the library files 132 can be used by program developers and others with or without interprocedural optimization.

Although FIG. 3 illustrates one example of a library file 132 containing augmented object files 130, various changes may be made to FIG. 3. For example, the library file 132 could contain any number of object files 130. Also, the library file 132 could contain object files that are not augmented by the compiler 120.

Figure 4:
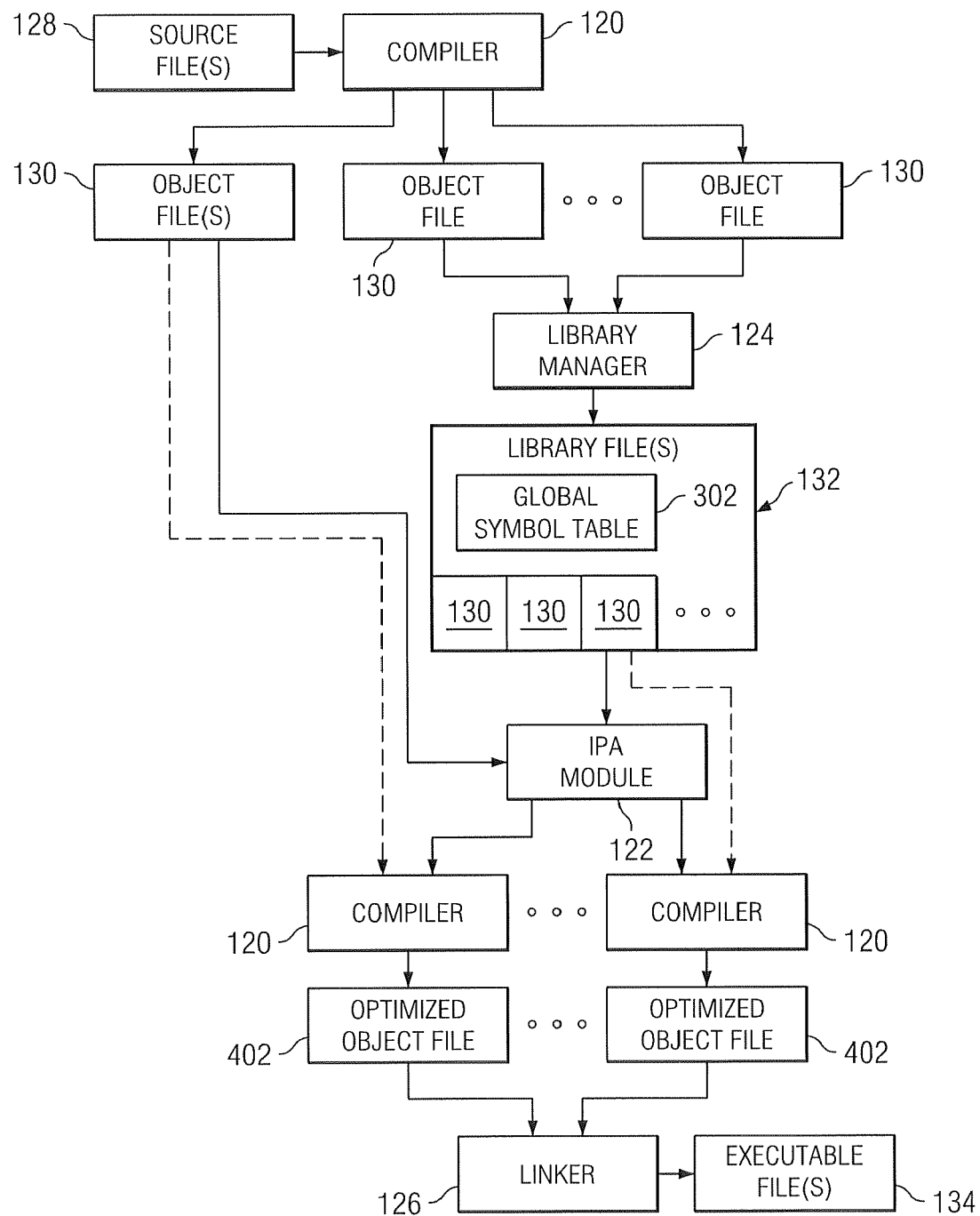
FIG. 4 illustrates example generation and use of augmented object files and library files containing augmented object files during compiler interprocedural optimization according to one embodiment of this disclosure.

FIG. 4 illustrates example generation and use of augmented object files 130 and library files 132 containing augmented object files 130 during compiler interprocedural optimization according to one embodiment of this disclosure. For ease of explanation, the generation and use of augmented object files 130 and library files 132 shown in FIG. 4 are described with respect to the system 100 of FIG. 1. The augmented object files 130 and library files 132 could be used with any suitable device and in any suitable system.

As shown in FIG. 4, the compiler 120 uses one or more source files 128 to generate one or more object files 130, at least one of which is an augmented object file 130. The library manager 124 is used to group some of the object files 130 (including one or more augmented object files 130) into one or more library files 132. In this example, at least one of the object files 130 remains outside of the library files 132.

The interprocedural analysis module 122 then analyzes the object files 130 needed to build an executable file 134, whether the object files 130 reside inside or outside of the library files 132. The interprocedural analysis module 122 may, for example, examine the interprocedural summary information 210 in augmented object files 130 to identify possible interprocedural optimizations that could be implemented.

If the interprocedural analysis module 122 identifies any interprocedural optimizations that can be used, the interprocedural analysis module 122 may re-invoke the compiler 120 to recompile the appropriate augmented object files 130 using the compiler internal representations 212 in those augmented object files 130. This may be done even if the recompiled augmented object file 130 resides in the library file 132. The recompilation of the augmented object files 130 leads to the creation of optimized object files 402. The optimized object files 402 represent augmented object files 130 that have been recompiled to implement interprocedural optimizations in the augmented object files 130. The interprocedural analysis module 122 or other source may then invoke the linker 126, which uses the optimized object files 402 to create the one or more executable files 134.

In some embodiments, the compiler 120 saves a description of the interprocedural optimizations used to generate the optimized object file 402 in the optimized object file 402 itself. For example, the compiler 120 could append the description to the optimized object file 402. In this way, if the interprocedural analysis module 122 later identifies one or more interprocedural optimizations for an augmented object file 130 (such as during a later compilation), the interprocedural analysis module 122 can use the description to determine if a previously saved optimized object file 402 can be used. If so, the interprocedural analysis module 122 may use the existing optimized object file 402 and need not re-invoke compilation of the augmented object file 402. If not, the interprocedural analysis module 122 re-invokes compilation of the augmented object file 130 to generate a new optimized object file 402. In this way, the interprocedural analysis module 122 may reduce the amount of time required for the interprocedural optimization to occur. Also, users may be given the option of saving the optimized object files 402. In addition, to avoid creating optimized object files 402 with identical names during compilation of different source files 128, each optimized object file 402 could have a unique name, such as a name that includes the name of the original source or object file and the name of the executable file being formed.

Although FIG. 4 illustrates one example of the generation and use of augmented object files 130 during compiler interprocedural optimization, various changes may be made to FIG. 4. For example, the linker 126 could use optimized object files 402, augmented object files 130, and regular object files 130 to produce the executable file 134. This may occur, for instance, when the interprocedural analysis module 122 does not identify any interprocedural optimizations for an augmented object file 130.

FIG. 5 illustrates an example method 500 for generating an executable program using compiler interprocedural optimization involving augmented object files according to one embodiment of this disclosure. For ease of explanation, the method 500 shown in FIG. 5 is described with respect to the system 100 of FIG. 1. The method 500 could be used with any suitable device and in any suitable system.

The system 100 compiles one or more source files into one or more object files at step 502. This may include, for example, the compiler 120 compiling a source file 128 to produce one or more object files 130. At least one of the object files 130 could represent an augmented object file containing interprocedural summary information 210 and a compiler internal representation 212.

The system 100 retrieves one or more additional object files from a library at step 504. This may include, for example, the compiler 120 extracting one or more object files 130 from a library file 132. The extracted object files 130 could include one or more procedures needed to successfully compile the source file 128. At least one of the extracted object files 130 could represent an augmented object file.

The system 100 performs interprocedural analysis using the object files at step 506, and the system 100 identifies one or more interprocedural optimizations at step 508. This may include, for example, the interprocedural analysis module 122 analyzing the interprocedural summary information 210 contained in the object files 130. The interprocedural analysis module 122 may use this information to identify one or more interprocedural optimizations that can be used with the procedures being used to form an executable program.

The system 100 recompiles one or more of the object files at step 510. This may include, for example, the interprocedural analysis module 122 invoking recompilation of any augmented object files 130 to implement the identified interprocedural optimizations. This may also include the compiler 120 generating one or more optimized object files 402. At least one of the object files 130 being recompiled could represent an augmented object file 130 extracted from the library file 132.

The system 100 links object files to generate one or more executable files at step 512. This may include, for example, the linker 126 linking one or more object files 130, augmented object files 130, and/or optimized object files 402 to form an executable file 134. At this point, the method 500 ends, and the executable file 134 may be executed by the system 100 or used in any other suitable manner.

Although FIG. 5 illustrates one example of a method 500 for generating an executable program using compiler interprocedural optimization involving augmented object files, various changes may be made to FIG. 5. For example, while shown as a series of steps in FIG. 5, various steps in FIG. 5 could overlap or occur in parallel, or various steps in FIG. 5 could occur in a different order.

In some embodiments, various functions performed during or in conjunction with interprocedural optimization are implemented or supported by a computer program that is formed from computer readable program code and that is embodied in a computer readable medium. The phrase "computer readable program code" includes any type of computer code, including source code, object code, and executable code. The phrase "computer readable medium" includes any type of medium capable of being accessed by a computer, such as read only memory (ROM), random access memory (RAM), a hard disk drive, a compact disc (CD), a digital video disc (DVD), or any other type of memory.

It may be advantageous to set forth definitions of certain words and phrases used in this patent document. The term "couple" and its derivatives refer to any direct or indirect communication between two or more elements, whether or not those elements are in physical contact with one another. The terms "application" and "code" refer to one or more computer programs, sets of instructions, procedures, functions, objects, classes, instances, or related data adapted for implementation in a suitable computer language or representation. The terms "include" and "comprise," as well as derivatives thereof, mean inclusion without limitation. The term "or" is inclusive, meaning and/or. The phrases "associated with" and "associated therewith," as well as derivatives thereof, may mean to include, be included within, interconnect with, contain, be contained within, connect to or with, couple to or with, be communicable with, cooperate with, interleave, juxtapose, be proximate to, be bound to or with, have, have a property of, or the like. The term "controller" means any device, system, or part thereof that controls at least one operation. A controller may be implemented in hardware, firmware, or software, or a combination of at least two of the same. It should be noted that the functionality associated with any particular controller may be centralized or distributed, whether locally or remotely while this disclosure has described certain embodiments and generally associated methods, alterations and permutations of these embodiments and methods will be apparent to those skilled in the art. Accordingly, the above description of example embodiments does not define or constrain this disclosure. Other changes, substitutions, and alterations are also possible without departing firm the spirit and scope of this disclosure, as defined by the following claims.

What is claimed is:

1. A method to be performed by at least one processor in a data processing system, comprising:

extracting, in the data processing system, at least one object file from a library of object files;

identifying, in the data processing system, an interprocedural optimization associated with a plurality of object files, each object file comprising interprocedural summary information generated by a compiler during a compilation of at least one source file and a compiler internal representation associated with the compiler during the compilation of the at least one source file, the plurality of object files including the at least one extracted object file;

invoking, in the data processing system, a recompilation of at least one of the plurality of object files to implement the identified interprocedural optimization by generating at least one optimized object file, wherein the interprocedural optimization is identified using the interprocedural summary information and the at least one recompiled object file is generated using the compiler internal representation, wherein the recompilation comprises saving a description of the identified interprocedural optimization in the at least one recompiled object file, wherein the description of the identified interprocedural optimization includes the behavior of a target procedure within the object file from the point of view of other procedures that invoke or that are invoked by the target procedure; and generating, in the data processing system, at least one executable file using the at least one recompiled object file by generating the at least one executable file using the at least one optimized object file.

2. The method of claim 1, wherein the description of the identified interprocedural optimization is appended at an end of the at least one recompiled object file.

3. The method of claim 2, further comprising storing, in the data processing system, the at least one recompiled object file within the library of object files, together with the at least one extracted object file.

4. The method of claim 2, wherein:
the at least one extracted object file comprises at least one of: the interprocedural summary information and the compiler internal representation; and
the at least one extracted object file can be used with or without interprocedural optimization.

5. The method of claim 1, further comprising storing, in the data processing system, a global symbol table within the library of object files.

6. The method of claim 1, wherein generating the at least one executable file comprises linking at least one procedure in the at least one recompiled object file with at least one other procedure.

7. The method of claim 1, wherein invoking recompilation of at least one of the plurality of object files comprises invoking recompilation of the at least one extracted object file.

8. An apparatus, comprising:
at least one memory capable of storing a library of object files; and
at least one processor capable of:
executing a compiler;
extracting at least one of the object files from the library of object files;
identifying an interprocedural optimization associated with a plurality of object files, each object file comprising interprocedural summary information generated by the compiler during a compilation of at least one source file and a compiler internal representation associated with the compiler during the compilation of the at least one source file, the plurality of object files including the at least one extracted object file;
recompiling at least one of the plurality of object files to implement the identified interprocedural optimization by linking at least one procedure in the at least one recompiled object file with at least one other procedure, wherein the interprocedural optimization is identified using the interprocedural summary information and the at least one recompiled object file is generated using the compiler internal representation, wherein the recompilation comprises saving a description of the identified interprocedural optimization in the at least one recompiled object file, wherein the description of the identified interprocedural optimization includes the behavior of a target procedure within the object file from the point of view of other procedures that invoke or that are invoked by the target procedure; and
generating at least one executable file using the at least one recompiled object file.

9. The apparatus of claim 8, wherein the description of the identified interprocedural optimization is appended at an end of the at least one recompiled object file.

10. The apparatus of claim 9, wherein the at least one processor is capable of storing the at least one recompiled object file within the library of object files, together with the at least one extracted object file.

11. The apparatus of claim 8, wherein:
the at least one processor is capable of generating at least one optimized object file during recompilation of at least one of the plurality of object files; and
the at least one processor is capable of generating the at least one executable file using the at least one optimized object file.

12. The apparatus of claim 8, wherein the at least one processor is capable of storing a global system table within the library of object files.

13. The apparatus of claim 8, wherein the at least one processor is capable of executing:
an interprocedural analysis module capable of identifying the interprocedural optimization;
a compiler capable of recompiling at least one of the plurality of object files; and
a linker capable of generating the at least one executable file;
wherein the interprocedural analysis module is capable of invoking recompilation of at least one of the plurality of object files by the compiler and invoking generation of the at least one executable file by the linker.

14. The apparatus of claim 8, wherein the at least one processor is further capable of: grouping object files to form the library.

15. A computer program embodied on a non-transitory computer readable medium and operable to be executed by a processor, the computer program comprising computer readable program code for:
extracting at least one object file from a library of object files;
identifying an interprocedural optimization associated with a plurality of object files, each object file comprising interprocedural summary information generated by a compiler during a compilation of at least one source file and a compiler internal representation associated with the compiler during the compilation of the at least one source file, the plurality of object files including the at least one extracted object file;
invoking recompilation of at least one of the plurality of object files to implement the identified interprocedural optimization by linking at least one procedure in the at least one recompiled object file with at least one other procedure, wherein the interprocedural optimization is identified using the interprocedural summary information and the at least one recompiled object file is generated using the compiler internal representation, wherein the recompilation comprises saving a description of the identified interprocedural optimization in the at least one recompiled object, wherein the description of the identified interprocedural optimization includes the behavior of a target procedure within the object file from the point of view of other procedures that invoke or that are invoked by the target procedure; and
invoking generation of at least one executable file using the at least one recompiled object file.

16. The computer program of claim 15, wherein the description of the identified interprocedural optimization is appended at an end of the at least one recompiled object file.

17. The computer program of claim 16, wherein the computer program further comprises computer readable program code for storing the at least one recompiled object file within the library of object files, together with the at least one extracted object file.

18. The computer program of claim 15, wherein:
the computer readable program code for invoking recompilation of at least one of the plurality of object files comprises computer readable program code for generating at least one optimized object file; and
the computer readable program code for invoking generation of the at least one executable file comprises computer readable program code for generating the at least one executable file using the at least one optimized object file.

19. The computer program of claim 15, wherein the computer readable program code for storing a global symbol table within the library of object files.

20. The computer program of claim 15, wherein the computer readable program code for invoking recompilation of at least one of the plurality of object files comprises computer readable program code for invoking recompilation of the at least one extracted object file.

* * * * *